US005122977A

United States Patent [19]

Pfeiffer

[11] Patent Number: 5,122,977

[45] Date of Patent: Jun. 16, 1992

[54] METHOD OF INK CONTROL IN A PRINTING PRESS

[75] Inventor: Nikolaus Pfeiffer, Heidelberg, Fed. Rep. of Germany

[73] Assignee: Heidelberger Druckmaschinen AG, Heidelberg, Fed. Rep. of Germany

[21] Appl. No.: 708,113

[22] Filed: May 28, 1991

Related U.S. Application Data

[63] Continuation of Ser. No. 337,560, Apr. 12, 1989, abandoned.

[30] Foreign Application Priority Data

Apr. 12, 1988 [DE] Fed. Rep. of Germany ....... 3812099

[51] Int. Cl.[5] ........................................ G06F 15/46

[52] U.S. Cl. ............................ 364/551.01; 101/211; 101/DIG. 45; 101/DIG. 47; 364/526; 364/558

[58] Field of Search ................. 364/550, 551.01, 525, 364/526, 558, 563, 518-522; 356/381, 425; 101/DIG. 45, DIG. 47, 175, 177, 134, 136, 211

[56] References Cited

U.S. PATENT DOCUMENTS 4,488,808 12/1984 Kato ........................ 364/551.01
4,648,048 3/1987 Dorn et al. .................... 364/526
4,649,502 3/1987 Keller et al. .................. 364/526
4,660,159 4/1987 Ott ............................ 364/526
4,665,496 5/1987 Ott ............................ 364/526
4,667,596 5/1987 Dotzel et al. .................. 101/211
4,706,206 11/1987 Benoit et al. ................. 364/526
4,752,892 6/1988 Lecha .......................... 364/526

FOREIGN PATENT DOCUMENTS 0228347 10/1989 European Pat. Off. .

*Primary Examiner*—Kevin J. Teska
*Attorney, Agent, or Firm*—Laurence A. Greenberg; Herbert L. Lerner

[57] ABSTRACT

Method of ink control in a printing press, includes optically measuring fields on sheets printed by the printing press, comparing an actual ink location for each measuring field, which is attained with the aid of the scanning, with a specified setpoint ink location and controlling inking elements of the printing press so as to reduce deviations in inking. The method further includes calculating film thickness/densities of printing inks required for attaining the setpoint ink location by using the actual ink location and the setpoint ink location; adjusting the inking elements of the printing press in accordance with the calculated film thicknesses/densities, when the setpoint ink location or an ink location within a specified tolerance range about the setpoint ink location is attained, indicating the non-attainment of the setpoint ink location or of the tolerance range about the setpoint ink location, and making a manual input before adjusting the inking elements and subsequently producing a printed sheet and/or further computing film thicknesses/densities.

11 Claims, 5 Drawing Sheets

METHOD OF INK CONTROL IN A PRINTING PRESS

This application is a continuation of application Ser. No. 337,560, filed Apr. 12, 1989, now abandoned.

The invention relates to a method of ink control in a printing press, and, more particularly, wherein measuring fields are optically scanned on sheets printed by the printing press, an actual ink location for each measuring field, which is attained with the aid of the scanning, being compared with a specified setpoint ink location and, further, wherein inking elements of the printing press are controlled so as to reduce deviations in inking.

In conventional methods of ink control, the inking elements are adjusted in accordance with the measurement results without paying any specific attention to tolerance limits for the film thicknesses or densities. It has also been known, however, to terminate the control process when the tolerance limits have been attained, so that inadequate color reproduction is tolerated rather than the non-exceeding of the maximum allowable film thicknesses.

Ultimately, it is the film thicknesses that are controlled in the printing press. In conventional systems, however, inputs and outputs for this purpose are mostly effected in density values which are related to the values for the film thicknesses by the Tollemaar function. Because a computation, output and/or input may be made on the basis of density values or of film thicknesses, the term film thickness/density is used hereinafter in the method according to the invention.

It is an object of the invention to provide a method of ink control in a printing press which increases print quality in an economical manner, in particular, to enable as precise an approximation as possible to a setpoint ink location for specified maximum allowable film thickness/densities.

With the foregoing and other objects in view there is provided in accordance with the invention a method of ink control in a printing press, wherein measuring fields are optically scanned on sheets printed by the printing press, an actual ink location for each measuring field, which is attained with the aid of the scanning, being compared with a specified setpoint ink location and, further, wherein inking elements of the printing press are controlled so as to reduce deviations in inking. The method includes steps for calculating film thicknesses/densities of printing inks in a printing press as required for attaining the setpoint ink location by using the actual ink location and the setpoint ink location; adjusting the inking elements of the printing press in accordance with the calculated film thicknesses/densities, when the setpoint ink location or an ink location is within a specified tolerance range about the setpoint ink location is attained, and if it is not, indicating the non-attainment of the setpoint ink location or of the tolerance range about the setpoint ink location, and making a manual input before adjusting the inking elements and subsequently the step of producing a printed sheet and/or further computing film thicknesses/densities.

Besides largely automatic control, this method enables manual intervention if a decision between various parameters of quality is required. Although the method is intended primarily for multicolor printing, it may also be used in single-color printing. By constant scanning of the printed sheets and correspondingly frequent readjustment of the inking elements, the method according to the invention may also be performed in a closed control loop.

In accordance with another measure of the invention, the method includes outputting signal values for extending the tolerance range and/or for increasing one or more film thicknesses/densities when the setpoint location or the tolerance range about the setpoint ink location is not attained.

This output may also be effected in the form of a suggestion to which the printer has merely to input one of a number of specified replies. Thus, in accordance with a further measure of the invention, the method includes, for example, following the output, interrogating an input as to whether the proposed extension of the tolerance range or the proposed increase of at least one of the film thicknesses/densities is to be implemented.

In accordance with a further measure of the invention, the method enables the ink location, while complying with the maximum allowable film thicknesses/densities, to approximate closely to the setpoint ink location. In this regard there is provided a method of ink control in a printing press, wherein measuring fields are optically scanned on sheets printed by the printing press, an actual ink location for each measuring field, which is attained with the aid of the scanning process, being compared with a specified setpoint ink location and, further, wherein inking elements of the printing press are controlled so as to reduce deviations in inking. The method includes the steps of computing a first ink location on a straight line connecting the actual ink location and the setpoint ink location. In case it should not be possible for the setpoint ink location to be attained within maximum allowable film thicknesses/densities, a point E1 is computed on a straight line connecting the actual color location and the setpoint location for which one of the printing inks has its maximum allowable film thickness/density for a first ink location, altering the film thicknesses/densities of further printing inks in an attempt to attain an ink location situated within as small a tolerance as possible with respect to the setpoint ink location, altering at least one of the film thicknesses/densities of the remaining printing inks until as small a distance as possible, weighted by the tolerances, from the setpoint ink location is attained when the maximum allowable film thickness/density of a second printing ink is attained, and sending data corresponding to the thus computed ink location to the inking elements of the printing press if the ink location attained lies within a specified tolerance.

In accordance with added measures of the invention, the method includes specifying the tolerance as a tolerance space, computing a plane after the first ink location has been computed, the plane including the first ink location and all ink locations attainable by alteration of the film thickness/density of the further printing inks; checking to determine which point of the plane requires a minimum tolerance space and setting this point as a new setpoint ink location; if the film thickness/density of at least one of the further printing inks is greater than the maximum allowable film thickness/density, computing a second ink location (E2) on a straight line connecting the first ink location and the new setpoint ink location, wherein one of the further printing inks attains the maximum allowable film thickness/density at the second ink location; computing a straight line on which there are situated those ink locations which may be attained by changing the film thickness/density of a third printing ink; and setting that point on the straight line at which the required tolerance space is at its minimum as a new setpoint ink location.

In accordance with an additional measure of the invention, the method includes, if the film thickness/density of the third printing ink is above the maximum allowable film thickness/density at the last-mentioned new setpoint ink location, checking whether an ink location lies on the straight line and within the tolerance for which the film thickness/density is at most equal to the maximum allowable film thickness/density for the ink location; and if affirmative setting the ink location as a new setpoint ink location.

In accordance with yet another measure of the invention, the method includes indicating a failure to find an ink location lying within the tolerance space and for which the film thicknesses/densities are not greater than the maximum allowable film thickness/density; and interrogating an input as to whether an extension of the tolerance space or an increase of the film thicknesses/densities is to be implemented.

In accordance with yet a further measure of the invention, the method includes computing the point of intersection of the straight line between the actual ink location and the setpoint ink location with the surface of the tolerance space, if an input is made to enable the maximum allowable film thickness/density to be exceeded; and, starting from the points of intersection, altering film thicknesses/densities which have not yet reached or exceeded the maximum allowable film thickness/density so as to minimize the distance, weighted by the tolerances, from the setpoint ink location.

In accordance with yet an added measure of the invention, the tolerance range and tolerance space in an L-, a-, b-ink space, respectively have the form of an ellipsoid, the longest axis of which extends parallel to the L-axis.

In accordance with an alternate measure of the invention, the tolerance range and tolerance space in an L-, a-, b-ink space, respectively, have the form of a cylinder, the axis of which extends parallel to the L-axis.

In accordance with a further measure of the invention, the tolerance range and tolerance space in an L-, a-, b-ink space, respectively have the form of a parallelepiped having axes respectively extending parallel to the L-, a- and b-axes.

In this regard, the tolerances in the direction of the brightness axis L and in the direction of the two ink axes a, b are independent of one another. A tolerance space in which the tolerances are dependent on one another in the direction of the two ink axes, the tolerance in the direction of the brightness axis being, however, independent of the latter axes, may be provided by a cylinder, the axis of which extends parallel to the brightness axis.

In accordance with a concomitant measure of the invention, the method includes indicating to the printer the required alterations to the tolerances or to the maximum allowable film thicknesses/densities.

Other features which are considered as characteristic for the invention are set forth in the appended claims.

Although the invention is illustrated and described herein as a method of ink control in a printing press, it is nevertheless not intended to be limited to the details shown, since various modifications may be made therein without departing from the spirit of the invention and within the scope and range of equivalents of the claims.

The method invention, together with additional objects and advantages thereof will be best understood from the following description when read in connection with the accompanying drawings, in which:

FIG. 3 to FIG. 11 are three-dimensional graphs in the ink space representing various steps of the method according to the invention wherein FIG. 3 is a three-dimensional representation of an allowed tolerance ellipsoid;

FIG. 4 is a three-dimensional representation of a straight line connecting an actual color point and a color setpoint;

FIG. 5 is a three-dimensional representation of a plane containing all color points that can be reached by varying two remaining ink color settings. The plane is shown as cross-hatched;

FIG. 6 shows a method step following an intersection of the plane of FIG. 5 with a tolerance ellipsoid;

FIG. 7 shows a method of finding a new color setpoint value Es' in case a real ellipse is found according to the step of FIG. 6;

FIG. 8 shows a method step of finding a setpoint value E2 on a straight line connecting setpoint values E1 and Es';

FIG. 9 shows a method step of determining a straight line S3'representing color setpoints reached by varying the color of the printing ink F3;

FIG. 10 shows a method step of obtaining an ink color setpoint Es" in case the straight line of FIG. 9 does not intersect the tolerance ellipsoid; and FIG. 11 shows a method step of determining a color point P, which is the point of intersection of the tolerance ellipsoid and the straight line connecting color setpoints Eact and Eset.

Like parts in the figures are identified by the same reference characters.

Figure 1:
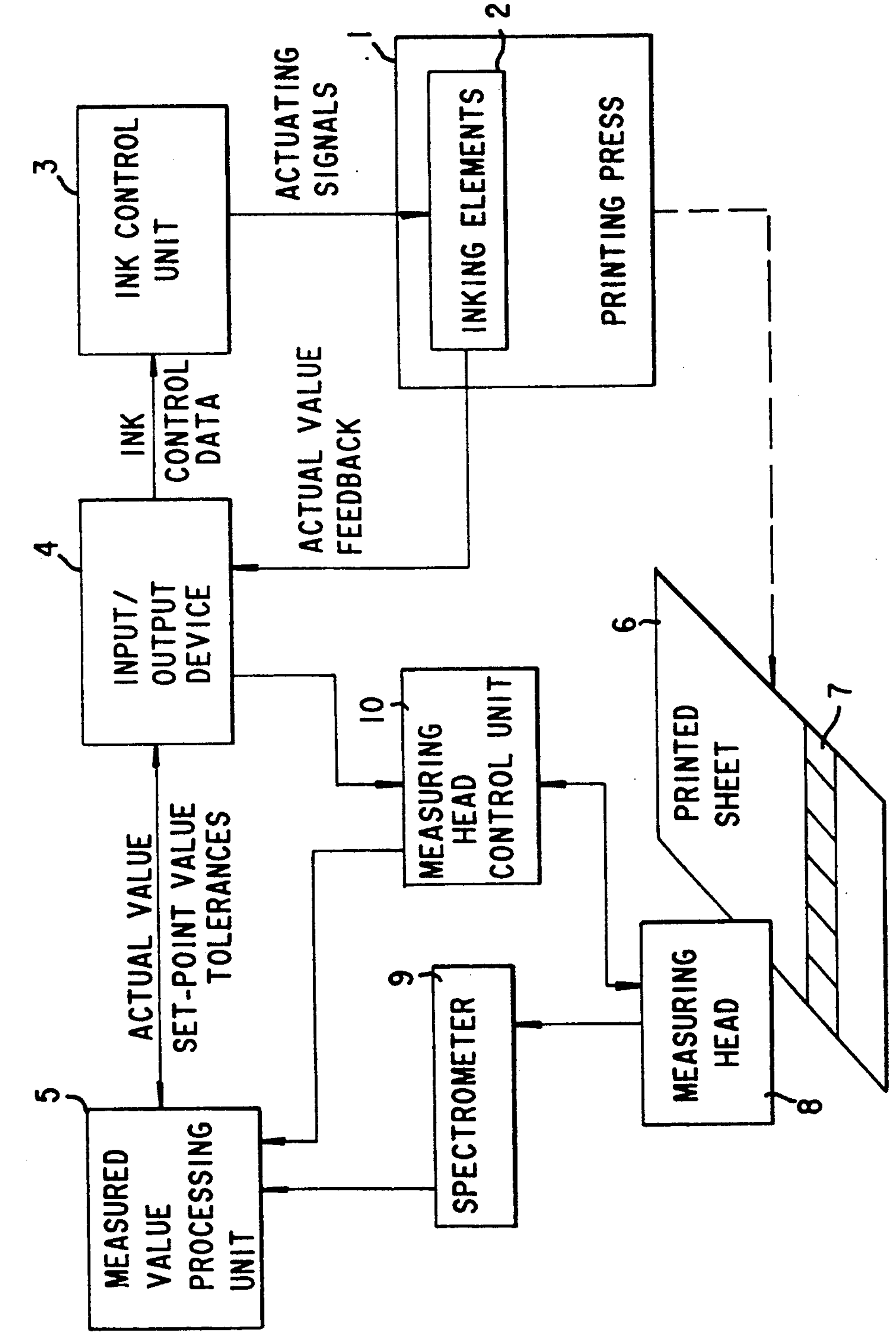
FIG. 1 is a block diagram of an apparatus for performing a method of ink control in a printing press according to the invention.

Referring now to the drawing and, first, particularly to FIG. 1 thereof, there is shown apparatus including a printing press 1 provided, in a conventional manner, with inking elements 2, with the aid of which the ink supply and with it the film thickness/density is controllable by actuating signals. These actuating signals are fed to the inking elements 2 from an ink control unit 3, which produces the actuating signals based upon ink control data, which are produced in an input/output device 4 in connection with a measured-value processing unit 5. An actual-value feedback to the input/output unit 4 is provided from the linking elements 2.

On one of the sheets 6 printed by the printing press, there is a print checking strip 7 with a number of link measuring fields. These measuring fields are scanned by a measuring head 8, which is part of an ink measuring device with a spectrometer 9. An electronic measuring-head control unit 10 controls the position of the measuring head 8, it being possible for the actual position of the measuring head 8 to be passed on to the measuring-head control unit 10 and further to the measured-value processing unit 5. Measured values are passed from the spectrometer 9 to the measured-value processing unit 5.

With the apparatus shown diagrammatically in FIG. 1, open-loop control or closed-loop control of the film thicknesses/densities with the effect of optimizing the color reproduction is possible in accordance with the method of the invention explained hereinafter in detail.

In this connection, for corrections that necessitate a decision between various parameters of quality, suggestions are made to the printer via the input/output device 4, which suggestions he may follow or revise by making appropriate inputs. The measured values from the spectrometer, namely the actual values, are interrogated at 21 according to the program flow-chart shown in FIG. 2.

At 22, the setpoint values, the tolerances and the respective maximum allowable film thickness/density Smax are taken from a memory (not shown).

The difference between the measured values and the setpoint values are formed by means of a subtraction 23, and are used to calculate the changes in the film thicknesses/densities ΔSs at 24. In the program stage 25 the existing film thicknesses/densities Sact are calculated from the actual values. The setpoint values for the film thicknesses/densities Snew are created by the addition of Sact and ΔSs at 26. These values are compared at 20 with the maximum values for the film thicknesses/densities.

Depending upon the result of this comparison the program branches at 27. If the setpoint film thicknesses/densities Snew are not greater than the maximum allowable film thicknesses/densities Smax, the data corresponding to the setpoint film thicknesses/densities Snew are supplied to the ink control unit 3 (FIG. 1) and the inking elements 2 of the printing press 1 are controlled accordingly.

If the setpoint film thicknesses/densities Snew are greater than the maximum allowable film thicknesses/densities Smax, however, an optimum point in the ink space is computed at 28, at which the film thicknesses/densities are smaller than the allowable film thicknesses/densities Smax. It is then decided at 29 whether this ink location lies within the tolerances. If this is the case, the output of the ink control data and the transfer thereof to the ink control unit 3 (FIG. 1) is, in turn, initiated in the program stage 30.

If the ink location does not lie within the tolerances, however, alternative suggestion for tolerances and film thicknesses/densities are calculated in the program stage 31 and indicated to the printer at 32.

The printer's input is interrogated in the program stage 33. If this input contains an extension of the tolerances, the calculated ink control data are outputted and transferred after the branch 34. If the printer has inputted no new tolerances but has inputted greater values for the allowable film thicknesses/densities, a new ink location is calculated after the branch 35 at 28. If this ink location lies within the tolerances, an output of the ink control data takes place. If this is not the case, alternative suggestions are, in turn, calculated with the result that the printer again has the opportunity of inputting new tolerances or new allowable film thicknesses/densities. If the printer inputs neither new tolerances nor new allowable film thicknesses/densities at 33, then, after the branches 34 and 35 have been run through, the printer is asked at 36 whether printing which does not lie within the allowable tolerances is to be performed. If the printer confirms this by making an appropriate input, corresponding ink control data are outputted to ink control unit 3 after the branch 37. If the printer does not allow any printing, however, which is not within the tolerances, this leads to a program abort at 38.

Figure 3:
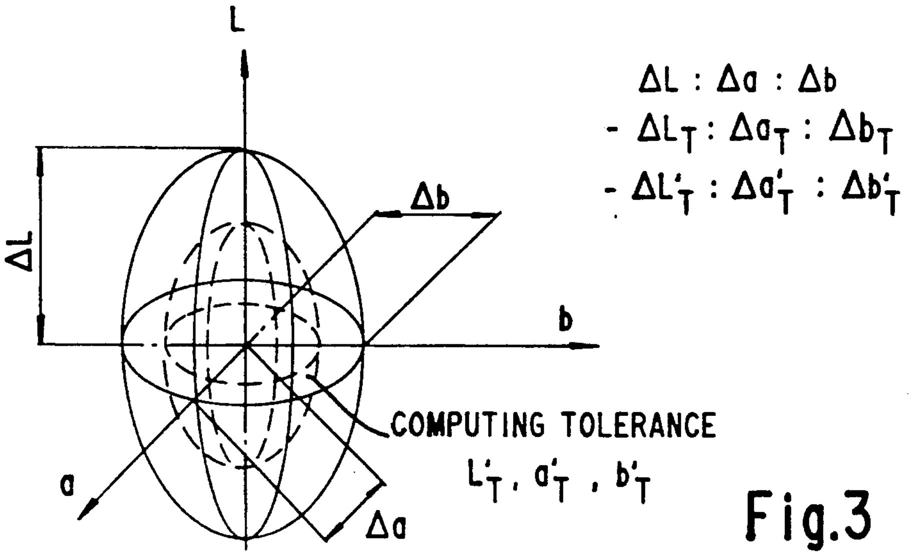

Before the individual method steps according to the invention are discussed with reference to an example shown in FIGS. 4 to 11, an explanation is provided of the tolerance and tolerance-range terms with the aid of FIG. 3 and with reference to the example of a tolerance ellipsoid. In the origin of the system of co-ordinates L, a, b respresenting the ink space according to FIG. 3, the setpoint value for the ink to be printed is assumed. Tolerances are given to all actual values that lie within an ellipsoid with the semi-axes ΔL, Δa and Δb. Because deviations in brightness tend to be accepted by people sooner than color checks, ΔL is here greater than Δa and Δb, respectively. The tolerance values on which each printing job is based are dependent on the respective print quality required and may be inputted by the printer. Because deviation between the measured and computed data, on the one hand, and the printed image, on the other hand, result from inaccuracies of measurement, linearization and fluctuations in the printing press, a "computing tolerance" is preferably used for the computations in the method according to the invention, that computing tolerance being smaller than the tolerance stated by the printer. This is shown in FIG. 3 as an ellipsoid in broken lines, which is similar to the ellipsoids based upon the inputted tolerances. In the interest of simplicity, however, the terms tolerance and tolerance ellipsoid are used hereinafter.

Figure 4:
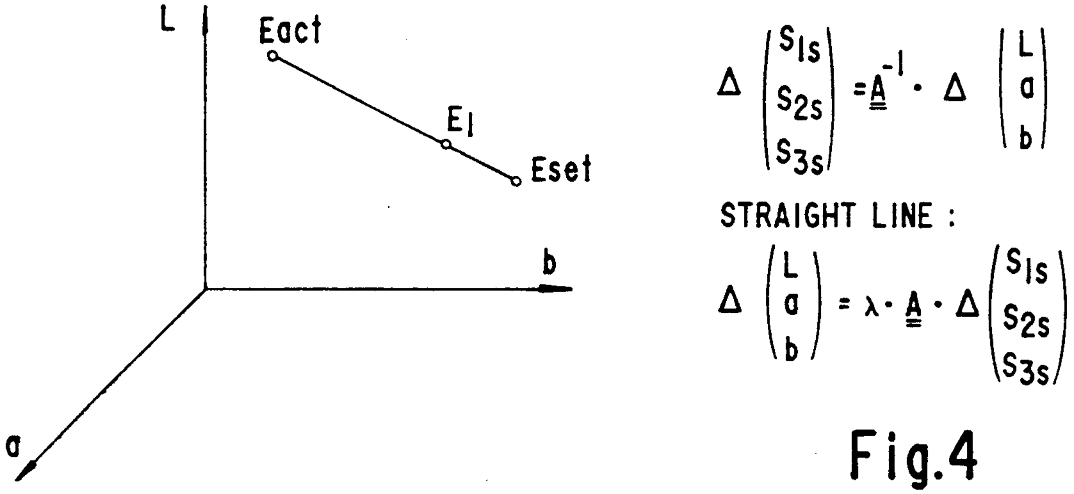

A first method step is explained herein with reference to FIG. 4. The ink location Eact, measured with the spectrometer 9, and the setpoint ink location Eset are connected by a straight line, the equation for which is likewise shown in FIG. 4. ΔL, Δa and Δb signify the differences of the co-ordinates of the setpoint ink location and the actual ink location; ΔS1s, ΔS2s and ΔS3s signify the differences of the film thicknesses/densities of the printing inks and A signifies a constant. λ is an independent variable which distinquishes the location on the straight line.

Figure 2:
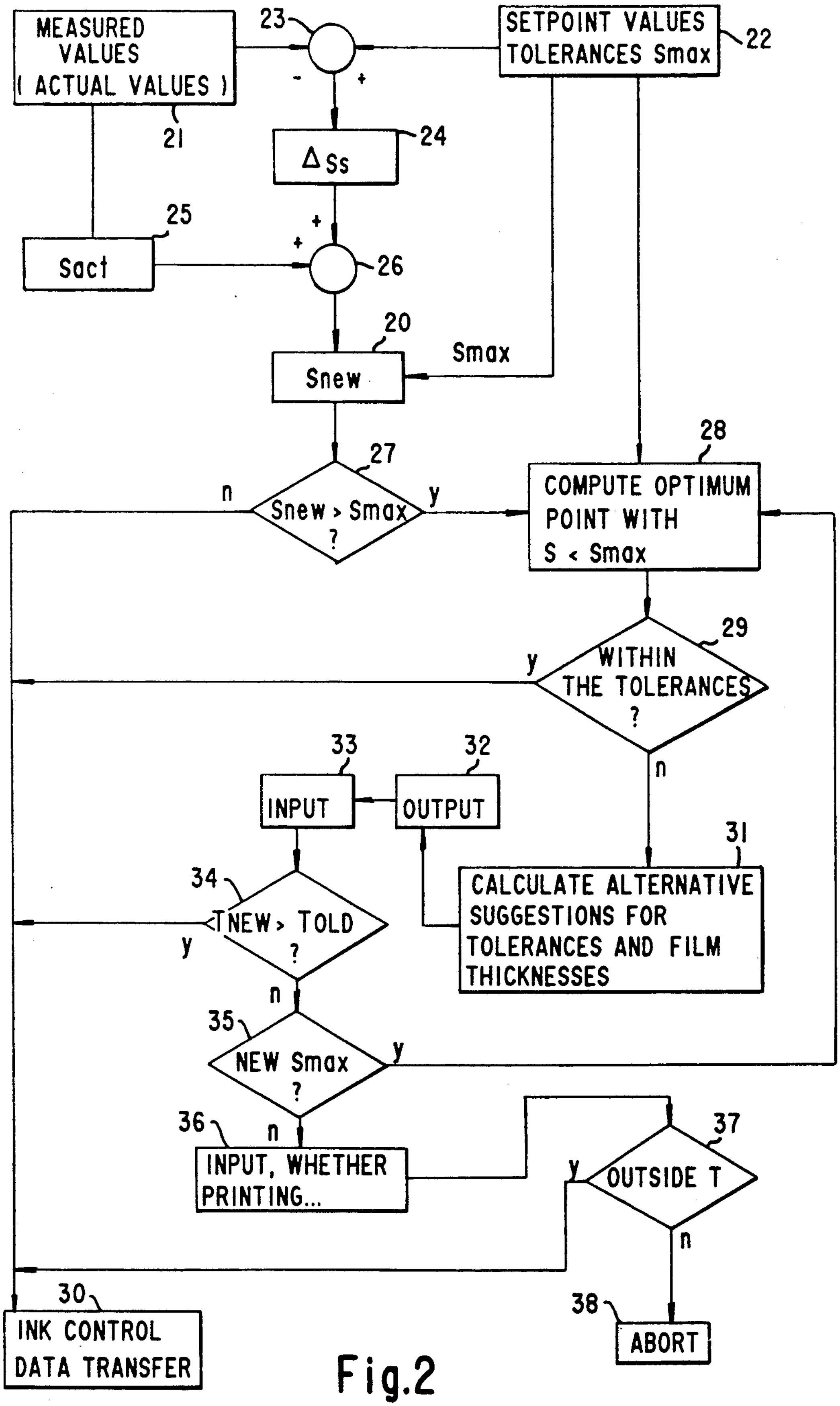
FIG. 2 is a program flow chart.

As explained hereinbefore in connection with the program flow-chart according to FIG. 2, no further computing steps are required if the film thicknesses/densities for the ink location Eset lie within the maximum allowable film thicknesses/densities. Should this not be the case, however, that printing ink is determined which is the first to reach the maximum allowable film thicknesses/density when there is an equal change of all three printing inks in proportion to the required change ΔSs. This printing ink is referred to hereinafter as F1.

After the printing ink F1 has been determined, that ink location E1 is computed on the straight connecting line between Eact and Eset at which the printing ink F1 has reached the maximum allowable film thickness/density. The following step is described with reference to FIG. 5. A plane of those ink locations is computed which may be attained by changing the remaining two printing inks. This plane is emphasized by shading in FIG. 5 as well as in further figures.

Figure 6:
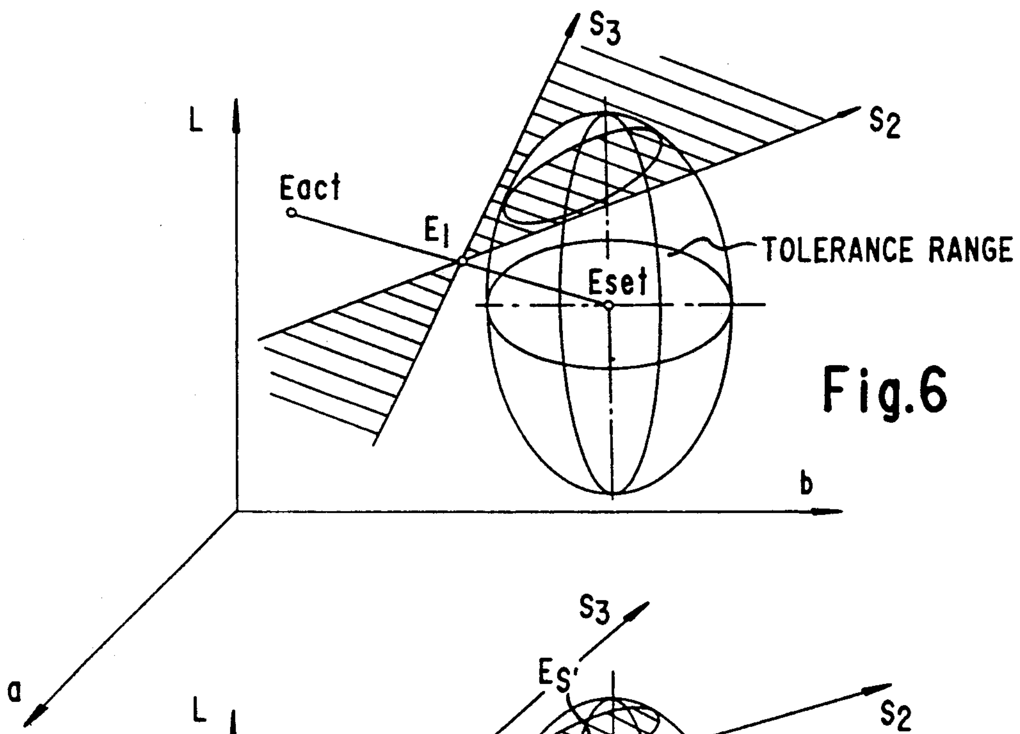

An intersection of the plane with the tolerance ellipsoid occurs in the method step represented in FIG. 6. This determines the number of ink locations which may be attained with the two printing inks F2 and F3 and that lie within the tolerance range. If the plane intersects the tolerance ellipsoid, a real ellipse is formed. If the plane avoids or keeps clear of the ellipsoid, the ellipse is imaginary.

The next method step is determining the point for which the necessary tolerance space is at its minimum, in this case the center point of the ellipse. This point becomes the new setpoint value Es'. In the case of an imaginary ellipse, Es' is that point on the plane that would in the case of an enlarged eilipsoid be the center point of the intersected ellipse. In this connection, the ellipse Es' is always real, even in the case of an imaginary ellipse.

Figure 7:
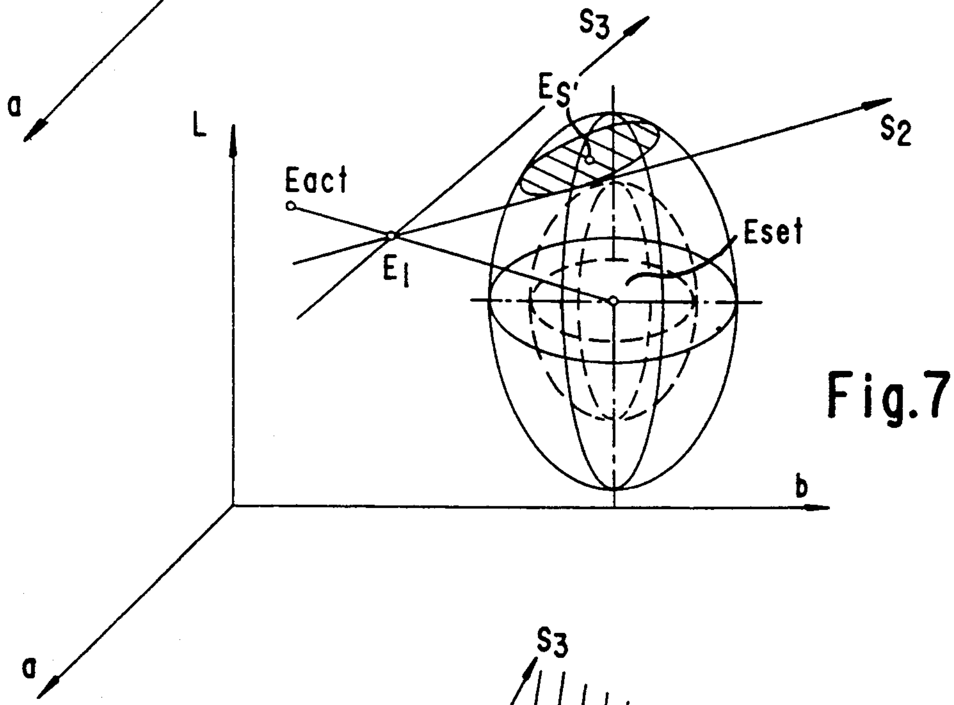
Figure 8:
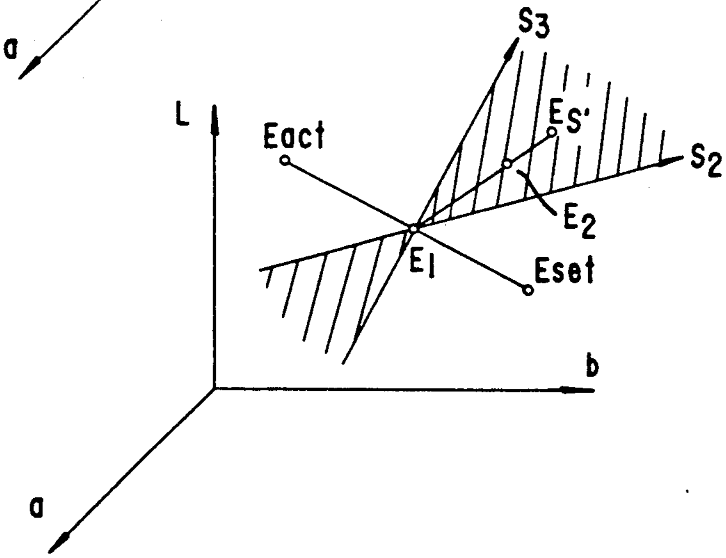
Figure 9:
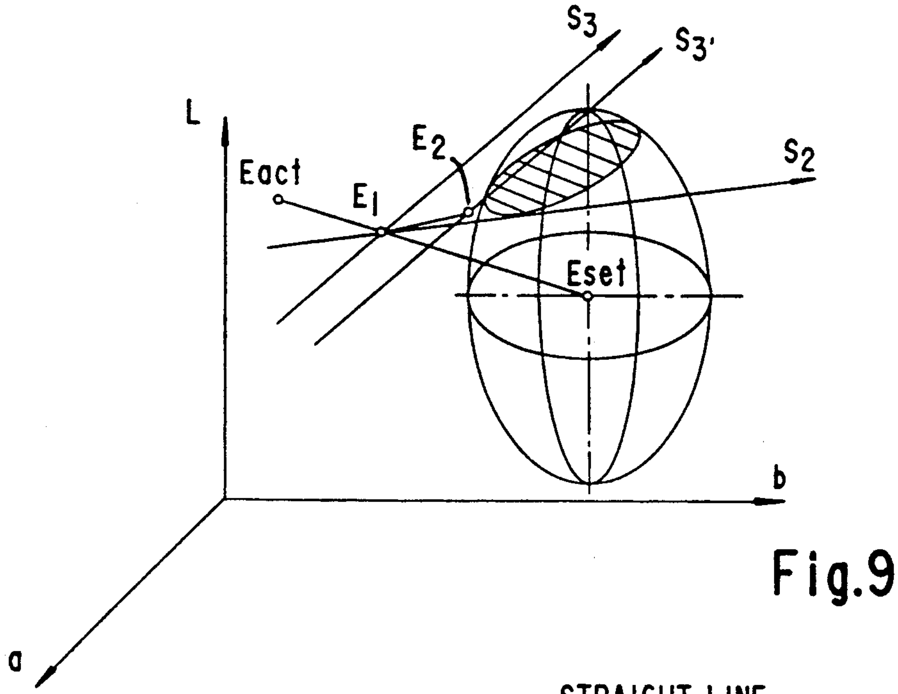

After the new setpoint value Es' has been determined as represented in FIG. 7, new setpoint values for the film thicknesses/densities are calculated and outputted insofar as there is a real ellipse and the film thicknesses/densities for Es' are not greater than Smax. Should the latter not be the case, starting from ink location E1, that printing ink is determined which is the first to attain the maximum allowable film thicknesses/density when there is an equal change of the two printing inks F2 and F3 in proportion to their required change ΔSs. The point E2 lies on the straight connecting line between E1 and Es' (FIG. 8).

Figure 5:
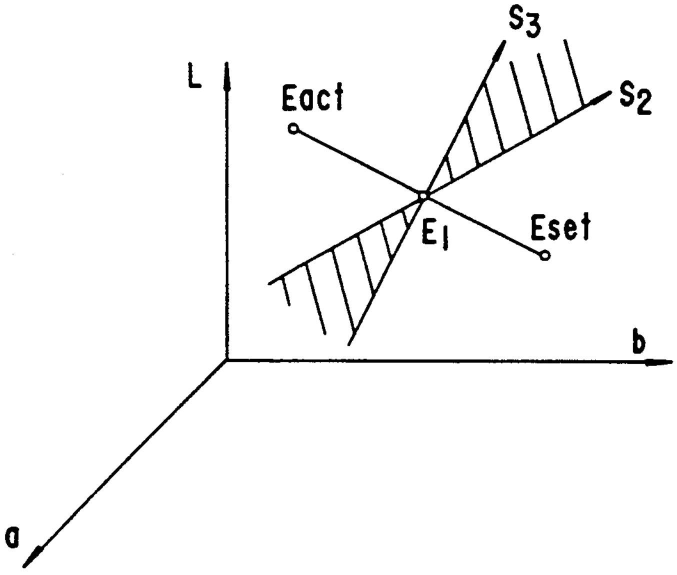

In a manner similar to that in which, according to FIG. 5, a plane was calculated for those ink locations which it was possible to reach by changing printing inks F2 and F3, a further process step computes a straight line that is described by a further change of printing ink F3. This straight line is identified in FIG. 9 by S3'. The intersection of the straight line S3' with the tolerance ellipse determines the number of those ink locations which can be attained with the third printing ink and which lie within the tolerance range. If the straight line avoids the ellipse, the points of intersection are imaginary, if there is an intersection, then they are real.

Figure 10:
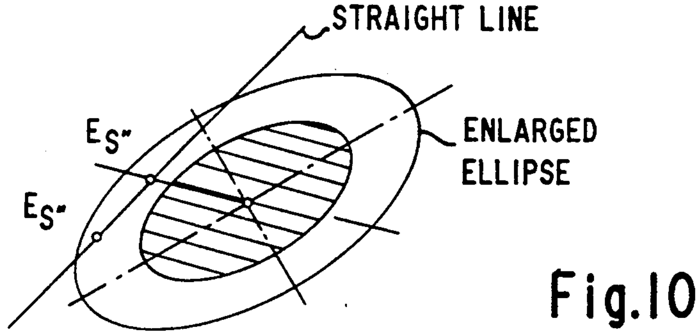
Figure 11:
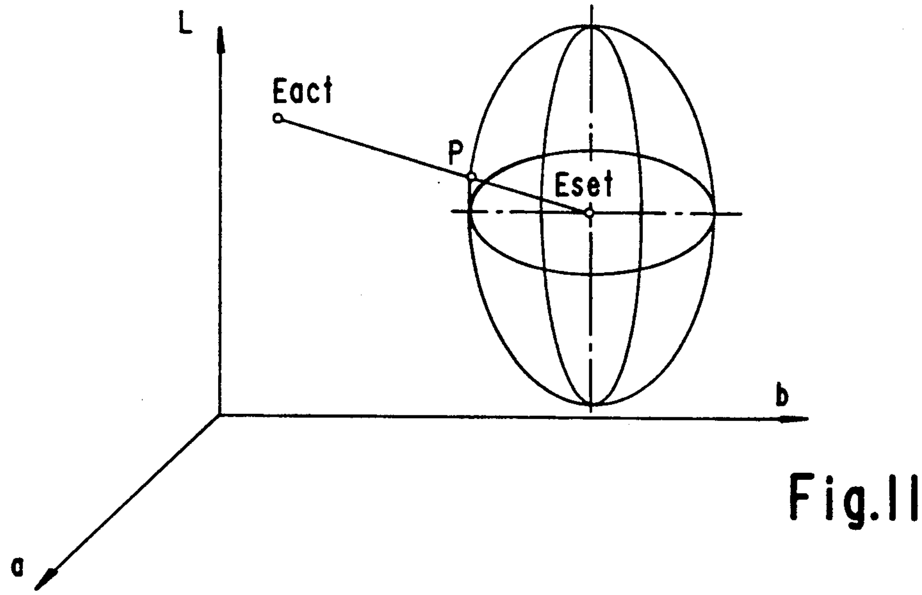

In a further method step, that point on the straight line at which the necessary tolerance space is at its minimum i.e. the center point of the chord formed by the straight line, is computed, and this point is assumed as the new setpoint value Es''. In the case of imaginary points of intersection, Es'' is that point that would be the center point when the ellipsoid is enlarged. Es'' is always real, even in the case of imaginary points of intersection. The formation of Es'', as shown in FIG. 10, is the case when the straight line S3' does not intersect the tolerance ellipsoid. If the film thickness/densities of the printing ink F3 is greater at Es'''than the maximum allowable film thickness/density Smax, ink location Es''' for which the film thickness/density corresponds to the maximum allowable film thickness/density Smax is determined.

Some or all of the aforedescribed method steps are carried out depending upon the specific circumstances. If the setpoint ink location Eset cannot be attained without exceeding the maximum allowable film thicknesses/densities, one of the ink locations Es', Es'' and Es ''' is calculated as the setpoint ink location. This is referred to hereinafter as Es*. If Es* lies within the tolerance ellipsoid, Es* is determined as the new setpoint value for closed-loop control. If Es* does not lie within the tolerance ellipsoid, however, the following options are presented to the printer:

1. Es* is used as the setpoint value for closed-loop control, even if Es* does not lie within the tolerance ellipsoid.
2. Increasing the tolerances: computation of a greater tolerance ellipsoid of the same form (i.e. ΔL, Δa and Δb are in the same ratio) in such a way that the ink location Es* lies within the tolerance.
3. Computation of the necessary changes of the maximum film thicknesses/densities, so that it is possible to print an ink location P on the straight connecting line Eact-Eset within and on the periphery, respectively, of the tolerance ellipsoid. For this purpose, the point P (FIG. 11) and the film thicknesses/densities necessary thereat are initially computed. Then a check is made whether the film thicknesses/densities of one or of two printing inks lie below the maximum permissible value. If this is the case, the method step according to FIG. 4 and the steps following it are performed in order to achieve the best approximation to the ink location Eset without further increasing the maximum film thicknesses/densities.

I claim:

1. Method for ink control of a printing machine, wherein measuring fields are optically scanned by a scanning device on sheets printed by the printing machine, each measuring field having an actual ink location in an ink space determined with the aid of the scanning device, and wherein inking elements of the printing machine are controlled with an input/output device so as to reduce deviations of an actual ink location from a first specified ink location, comprising the steps of:
   - scanning optically a test field printed on a printed sheet to determine the actual ink location of the test field;
   - comparing the actual ink location with the first specified ink location to determine any deviation of the actual ink location from the first specified ink location;
   - determining, in case of any deviation, a necessary ink density of a given ink color required to reach from the actual ink location to the first specified ink location;
   - determining, in case the first specified ink location is not reachable without exceeding a maximum allowable ink density, a second specified ink location, within the maximum allowable ink density and having a deviation from the first specified ink density which is as small as possible; and
   - moving the inking elements of the printing machine if the second specified ink location falls within a given tolerance space about the first specified ink location.

2. Method according to claim 1, wherein said tolerance space is shaped as an ellipsoid in the ink space defined by an L-, a-, and b-axis, and wherein said ellipsoid has its longest axis parallel with the L-axis.

3. Method according to claim 1, wherein said tolerance space is shaped as a cylinder in the ink space defined by an L-, a-, and b-axis, and wherein said cylinder has an axis parallel with said L-axis.

4. Method according to claim 1, wherein said tolerance space is shaped as a parallelepiped in the ink space defined by an L-, a-, and b-axis, and wherein said parallelepiped has axes parallel with said L-axis.

5. Method according to claim 1, wherein a printer operates the printing machine, and the printing machine has indicators for indicating the tolerances for the maximum allowable ink densities, further comprising the step of setting by the printer the ink densities according to said indicators.

6. Method according to claim 1, further comprising the step of adjusting the ink keys and next continuing printing and/or computing further ink densities after manual entry of data by a printer.

7. Method according to claim 1, further comprising the steps of:
   - determining, in case the first specified ink location cannot be reached within the maximum allowable ink density, a straight line in the ink space which connects the actual ink location and the first specified ink location, and determining on said straight line a third specified ink location such that one of the ink colors is at its maximum allowable ink density;

varying the ink density of the other ink colors to find an alternate second specified ink location so that it falls within the smallest possible tolerance about said first specified ink location;

varying, upon reaching the maximum allowable ink density of a second ink color, the density of the remaining ink colors until a smallest possible distance to said first specified ink location is reached; and moving the inking elements if the alternate second specified ink location falls within a given tolerance.

8. Method according to claim 7, wherein the given tolerance is defined by a defined tolerance space, and the method further comprising the steps of:

determining, after determining the third specified ink location, a plane including all specified ink locations reachable by varying said ink densities;

seeking on the plane a point wherein a minimum tolerance space is required, and selecting said point as the alternate second specified ink location;

determining, for the alternate second specified ink location, if the ink density for at least one of the further ink colors is greater than the maximum allowable ink density, on a straight line connecting the alternate second specified ink location and the third specified ink location, a fourth specified ink location whereat one of the other ink colors has reached the maximum allowable ink density;

determining a straight line which defines those ink locations that can be reached by varying the ink density of a third ink color; and selecting the reached ink location on the straight line as a fifth specified ink location, so that the fifth specified ink location has a least possible deviation from the first specified ink location.

9. Method according to claim 8, comprising the steps of:

seeking, in case the fourth specified ink location has an ink density of the alternate third ink color which is above the maximum allowable ink density, an ink location on said straight line and within the tolerance for which the ink densities are not greater than the maximum allowable ink density; and selecting, if existing, such an ink location as an alternate fifth specified ink location.

10. Method according to claim 9, further comprising the steps of:

expanding in case not one of the third, fourth and alternate fifth specified ink locations is found, at least one of the tolerance space or the ink density.

11. Method according to claim 10, further comprising the steps of:

determining, in case the maximum allowable ink density will be exceeded, the intersection of a straight line between the actual ink location and the first specified ink location and the surface of the tolerance space; and varying the ink density of those inks not exceeding the maximum allowable ink density from said intersection, weighted with the tolerances, in order to minimize the weighted distance.

* * * * *